United States Patent [19]

Napper

[11] Patent Number: 4,861,051

[45] Date of Patent: Aug. 29, 1989

[54] REHABILITATION WALKER DEVICE

[76] Inventor: John C. Napper, 600 7th St., International Falls, Minn. 56649

[21] Appl. No.: 203,288

[22] Filed: Jun. 6, 1988

[51] Int. Cl.[4] .................... B62B 7/00

[52] U.S. Cl. .................... 280/87.021; 135/67; 272/70.3; 297/5

[58] Field of Search .................... 272/70.3; 297/5; 280/87.02 R, 87.02 W, 87.021; 135/67

[56] References Cited

U.S. PATENT DOCUMENTS

| | | | |
|---|---|---|---|
| D. 183,908 | 11/1958 | Bauer | 297/5 X |
| 202,724 | 4/1978 | Headler | 280/87.0 |
| 1,196,129 | 8/1916 | McCormick | 280/282 |
| 1,742,518 | 1/1928 | Rainey | 280/87.02 W |
| 2,423,590 | 7/1947 | Fageol | 280/87.01 |
| 2,530,544 | 11/1950 | Schwantes | 297/5 X |
| 3,180,678 | 4/1965 | McCabe | 297/5 |
| 3,561,778 | 2/1971 | La Brie | 280/7.14 |
| 3,847,409 | 11/1974 | Shaffer | 280/87.02 R |
| 3,992,024 | 11/1976 | Workman | 280/87.02 W |
| 4,065,145 | 12/1977 | Chambers | 280/87.02 R |
| 4,159,110 | 6/1979 | Dodenhoff | 272/70.3 |
| 4,211,426 | 7/1980 | Motloch | 280/87.02 W |
| 4,277,100 | 7/1981 | Beougher | 297/5 |
| 4,281,844 | 8/1981 | Jackman et al. | 280/87.01 |
| 4,469,372 | 12/1984 | Long | 297/5 |
| 4,523,770 | 6/1985 | Lee | 280/87.04 A |
| 4,770,410 | 9/1988 | Brown | 272/70.3 |

FOREIGN PATENT DOCUMENTS

| | | | |
|---|---|---|---|
| 919056 | 2/1963 | United Kingdom | 272/70.3 |

*Primary Examiner*—Charles A. Marmor
*Assistant Examiner*—Michael Mar
*Attorney, Agent, or Firm*—Merchant, Gould, Smith, Edell, Welter & Schmidt

[57] ABSTRACT

A rehabilitation walker device is disclosed. The walker device includes a seat a frame a seat support mechanism supporting the seat, handlebars supported by an upright handlebar support mechanism and a centerbar for connecting the seat support mechanism with the upright handlebar support mechanism, a pair of forward wheels pivotally attached to the handlebar support mechanism, and a pair of rear wheels pivotally attached to the frame proximate the seat support mechanism. The seat has a center and a width and the handlebars are located in front of the seat. The forward wheels are located in front of the seat and are separated by a first wheel span. The first wheel span is wide enough to allow sufficient space for a person to walk with both feet within the first wheel span while straddling the centerbar. The rear wheels are located behind the center of the seat and are separated by a second wheel span. The second wheel span is substantially the same as or narrower than the width of the seat, preferably narrower.

18 Claims, 3 Drawing Sheets

REHABILITATION WALKER DEVICE

FIELD OF THE INVENTION

The present invention relates to a combination walker and ambulatory seat device for assisting a person having impaired or reduced ambulatory skills. The rehabilitation walker device of the present invention provides an assistive device for elderly persons or others who need assistance when walking whether temporarily or permanently impaired.

BACKGROUND OF THE INVENTION

Various types of assistive devices have been used by persons who have temporarily or permanently impaired ambulatory skills. These devices are wellknown in the art. Most of these devices must be moved in a two-step process wherein the person leans on the assistive device when they are taking steps and then lifts and moves the assistive device ahead when the person has reached a stable equilibrium with respect to their movement.

Occasionally, a walker is constructed with wheels as disclosed by Dodenhoff (U.S. Pat. No. 4,159,110). Although it is probably easier to move about, such a structure may provide an element of risk because the wheels can permit the walker to slide away from an assisted person if they lose their balance temporarily and rely solely on the handlebars for support.

Beougher (U.S. Pat. No. 4,277,100) discloses a rigid frame structure having wheels and a seat member which allow an individual to alternately walk with the assistance of the rigid frame structure or sit on the seat of the assistive device. Although this structure provides alternate means of support, it is difficult to use because it is difficult to turn the rigid frame structure and difficult to enter or approach the frame structure and seat oneself on the seat member because of the obstacles presented by the frame itself. In addition, because the individual's weight can shift when seated to a point behind the rear wheels, there is a danger that the individual's weight will not be supported and they will fall off of the seat as it flips backward.

It will be apparent from the difficulty of handling and the difficulty of approaching and seating oneself upon the seat of the prior art device, that a need exists for an assistive device which allows easy access for one having impaired ambulatory skills and allows such an individual to easily manipulate the device during its use.

The present invention addresses these and other problems associated with the prior art assistive devices and also offers other advantages over the prior art and solves other problems associated therewith.

SUMMARY OF THE INVENTION

In accordance with the present invention, a rehabilitation walker device is provided. The walker device comprises a seat having a center and a width; frame means including means for supporting the seat, handlebar means including upright means for supporting the handlebar means, and centerbar means for connecting the seat support means with the upright handlebar support means; a pair of forward wheels pivotally attached to the handlebar support means; and a pair of rear wheels pivotally attached to the frame means proximate said seat support means. The handlebar means are located in front of the seat. The forward wheels are located in front of the seat and are separated by a first wheel span. The first wheel span is wide enough to allow sufficient space for a person to walk with both feet within the first wheel span while straddling the centerbar means. The rear wheels are located behind the center of the seat and are separated by a second wheel span. The second wheel span is substantially the same as or narrower than the width of the seat. Preferably, the second wheel span is narrower than the width of the seat. In preferred embodiments the centerbar means includes a centerbar having height lower than the height of the uppermost portion of the forward wheels, and the seat has a canted forward edge.

The present invention presents many advantages over the prior art devices. It is extremely easy to approach and engage by an individual with impaired ambulatory skills. Because the centerbar is quite low and the seat provides a canted forward edge, it is easy to approach the device and engage it with one's rear end while gripping the handlebars. The person's leg need not be lifted over the centerbar in order to engage the seat with the rear end, however, it is not difficult to raise one's leg over the relatively low centerbar if one so chooses.

Once the individual is seated on the device, it is an especially stable device because it has a plurality of rear wheels which provide for greater stability. Weight from the seat is distributed over a four-point support system. At the same time, because the rear wheels have a rather narrow wheel span, the rear portion of the device is rather easy to manipulate in lateral directions by pushing off with a leg on one side or the other of the seat. This arrangement of the wheels is particularly advantageous because it provides the stability of a four-point support as well as much of the lateral mobility generally associated with a three-point support system.

Because both stability and mobility of assistive devices such as the preferred embodiments of the present invention are extremely important to persons with impaired ambulatory skills, the present invention provides great advantages over the prior art.

The above-described features and advantages along with various other advantages and features of novelty are pointed out with particularity in the claims of the present invention. However, for a better understanding of the invention, its advantages, and object attained by its use, reference should be made to the drawings which form a further part of the present application and to the accompanying descriptive matter in which there is illustrated and described preferred embodiments of the present invention.

BRIEF DESCRIPTION OF THE DRAWINGS

In the drawings, in which like and primed reference numerals and letters indicate corresponding parts of preferred embodiments of the present invention throughout the several views.

DETAILED DESCRIPTION OF THE PREFERRED EMBODIMENTS

Figure 1:
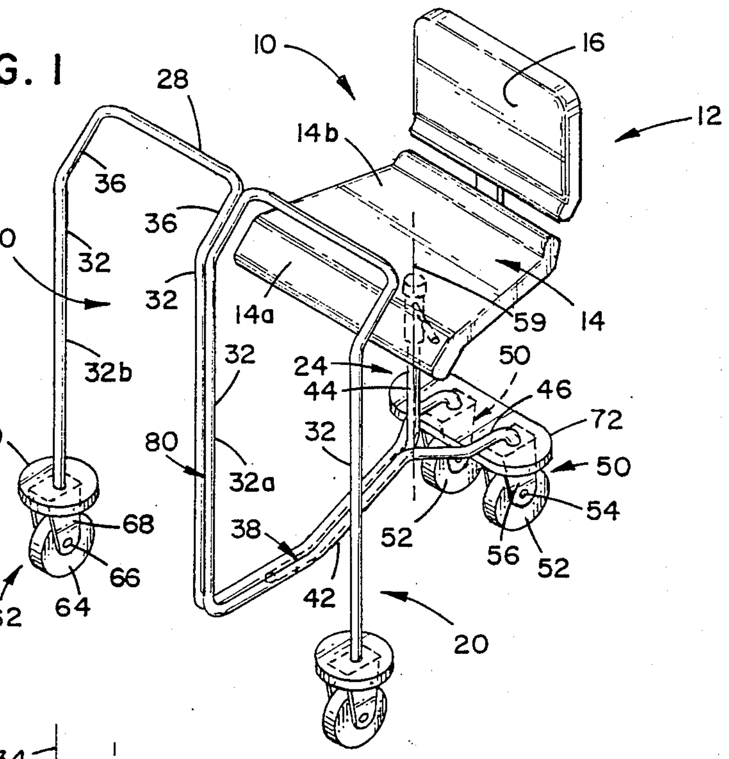
FIG. 1 is a perspective view of a rehabilitation walker device in accord with the present invention.
Figure 2:
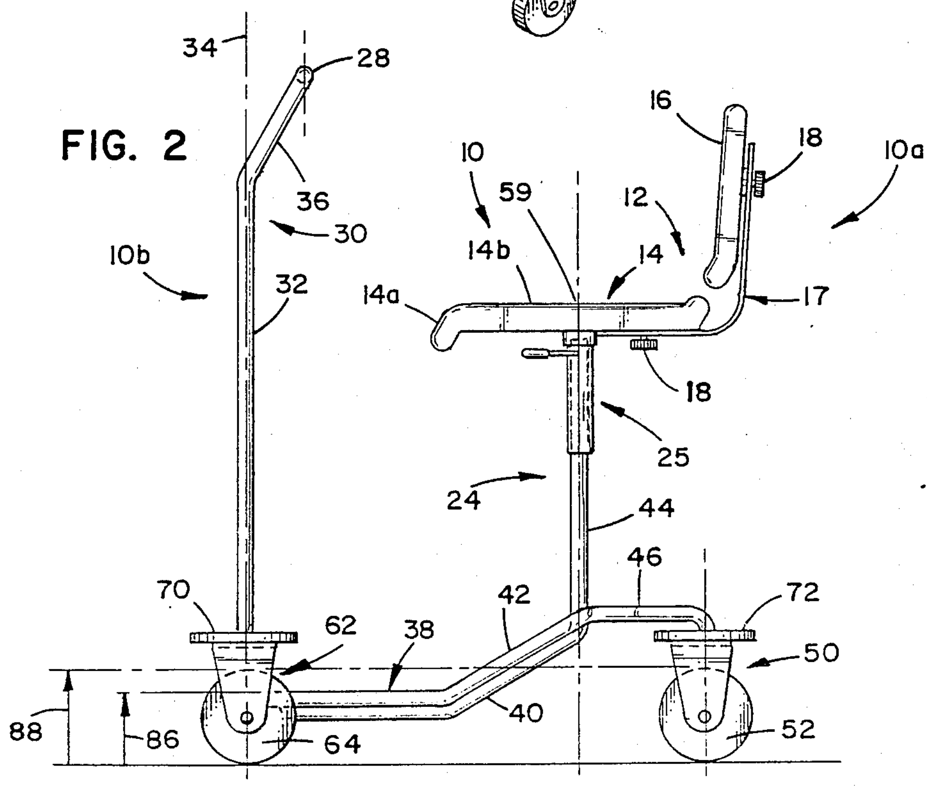
FIG. 2 is a side view of the walker device shown in FIG. 2.

Referring now to the drawings, and specifically to FIGS. 1 and 2, the rehabilitation walker device 10 comprises a seat 12 and a frame 20. The seat 12 includes a seat portion 14 and a back portion 16 connected by a seat back adjustment mechanism 17 having adjustment knobs 18 which can be independently loosened to either adjust the height or the depth of the back portion 16 with respect to the seat portion 14. The seat portion 14 includes a forward edge 14*a* extending outward and downward from a substantially flat seat surface 14*b*.

The seat is pivotally attached to the frame 20 by a seat supporting mechanism 24. The seat supporting mechanism 24 is adjustable so that the seat 12 may be raised or lowered. The adjustment mechanism 25 includes a resilient spring mechanism which is not shown.

The frame 20 further includes handlebars 28 supported by an upright handlebar supporting mechanism 30. The handlebar supporting mechanism 30 includes a plurality of vertical support members 32 located substantially along a vertical plane 34. The handlebars 28 are connected to the vertical support members 32 by canted connecting members 36, allowing the handlebars 28 to be located behind the vertical plane 34.

The frame 20 also includes a centerbar 38 connecting the seat supporting mechanism 24 to the handlebar supporting mechanism 30. The seat supporting mechanism 24 includes an upright member 44 connected to a medial member 40 which is attached to two adjacent bar members 42 of the center bar 38. The adjacent bar members 42 of the centerbar 38 extend from the center vertical support members 32*a* to the upright member 44 of the seat supporting mechanism 24 and then fork around the upright member 44. The extension members 46 are the extension of the adjacent bar members 42 which extends beyond the upright member 44 to connect with the rear wheel mechanisms 50. The rear wheel mechanisms 50 are pivotally attached to the frame 20 and include wheels 52 which rotate on axels 54 which are attached to housings 56 which are pivotally attached to the frame 20 at the end of the extension members 46.

Figure 3:
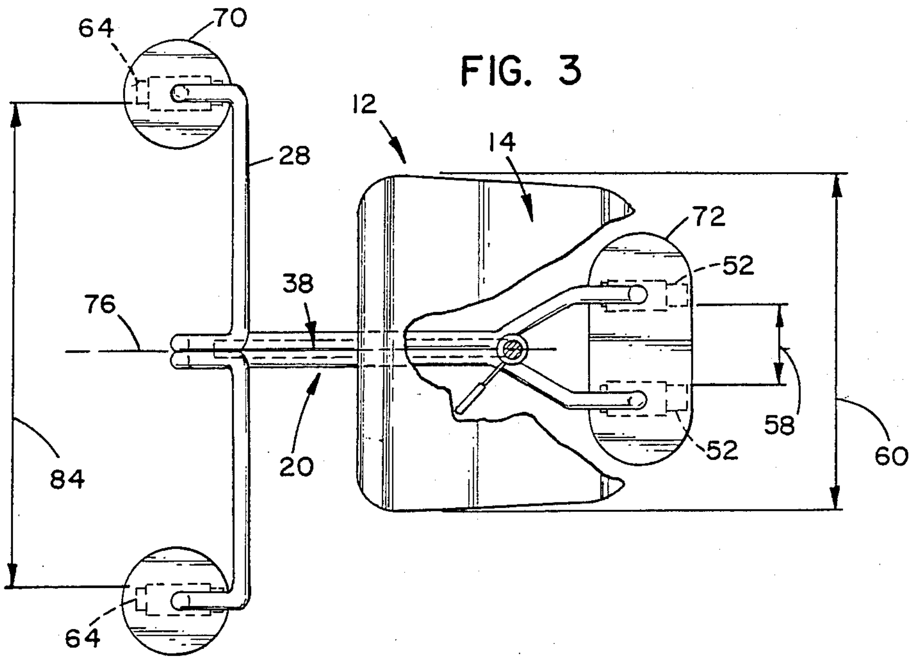
FIG. 3 is a sectional plan view of the walker device shown in FIGS. 1 and 2.
Figure 4:
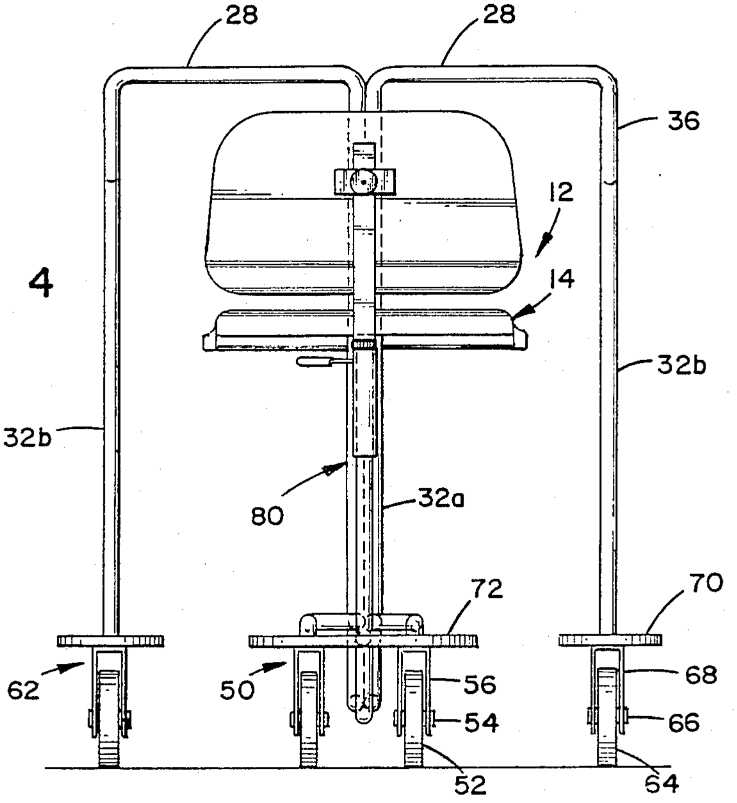
FIG. 4 is a front view of the walker device shown in FIGS. 1–3.

Referring now also to FIGS. 3 and 4, the rear wheels 52 are equidistant from the centerbar 38 and have a wheel span 58 substantially the same as or narrower than, preferably narrower than, a width 60 of the seat 12.

The front wheel mechanisms 62 are pivotally attached to the outer vertical support members 32*b*. The front wheel mechanism 62 include front wheels 64 which rotate on front axels 66 connected to wheel housings 68 which are pivotally attached to the outer vertical support members 32*b*. Circular rubber bumpers 70 encircle the circumference of the outer vertical support members 32*b* and rest upon the wheel housings 68 to prevent collisions between the wheels 64 or wheel housings 68 and objects coming into contact with the bumpers 70. In the rear of the device 10*a* and ellipsoid rubber bumper 72 provides protection with respect to the rear wheels 52 in a similar manner.

Figure 5:
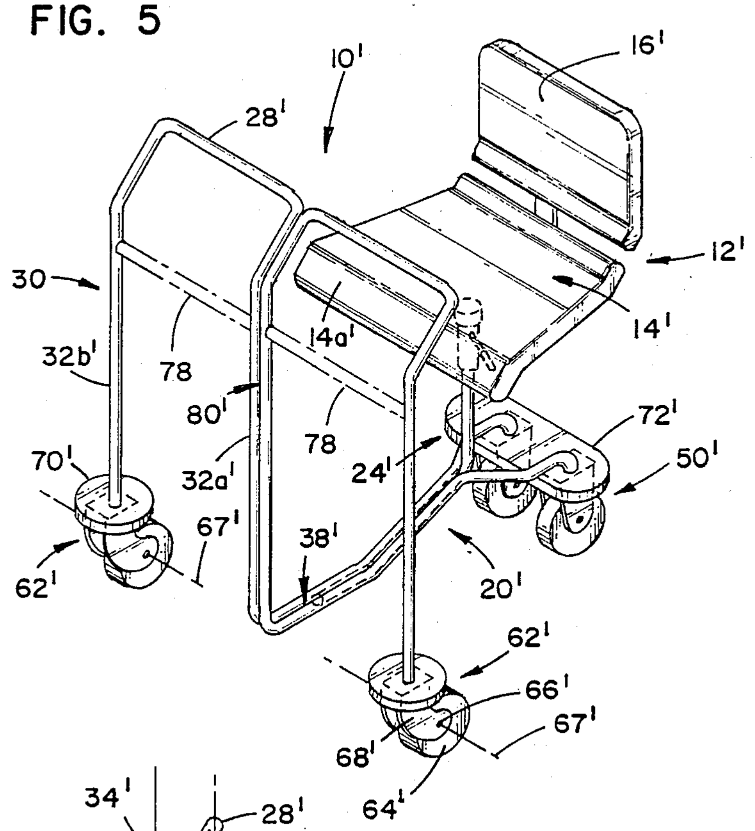
FIG. 5 is a perspective view of an alternate embodiment of the rehabilitation walker device in accord with the present invention.
Figure 6:
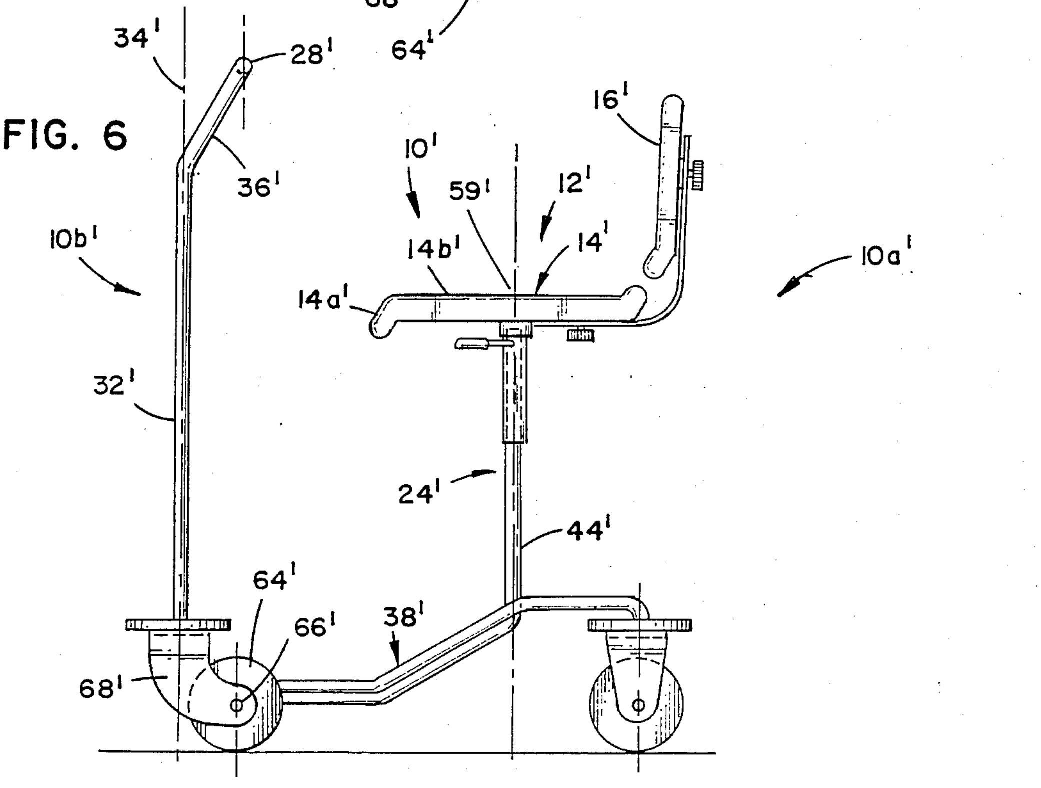
FIG. 6 is a side view of the walker device shown in FIG. 5.

Referring now also to FIGS. 5 and 6, an alternate embodiment of the present invention includes front wheels 64' which are canted backward to provide ergonomic advantages with respect to pushing the device 10'. The axels 66' attaches to the housings 68' in a location behind the vertical plane 34' of the vertical support members 32' when the device 10' is pushed forward. Although the housings 68' can rotate around the bottom of the outer vertical support members 32*b*, the horizontal axis 67' through each axel 66' is always removed from the space directly beneath the outer vertical support members 32*b*.

The canted forward edge 14*a* of the seat 12 provides several advantages. First, the sloping forward edge 14*a* reduces the likelihood of muscle soreness in the back of the legs of a person caused by sitting on the edge of the seat portion 14 for extended periods of time. Second, the canted forward edge 14*a* has the effect of lowering the front portion of the seat portion 14 so that the seat is easier to engage by one easing back into the seat 12 or initially engaging the seat 12. Another general advantage of the structure of the seat 12 is that it is somewhat wider at the front edge 14*a* which further facilitates engagement with the seat 12.

Figure 8:
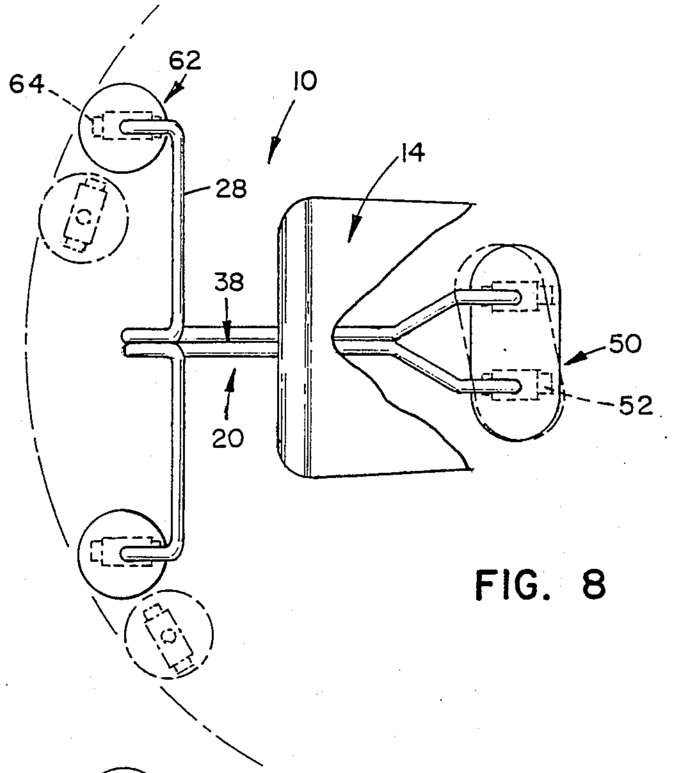
FIG. 8 is a sectional plan view of the walker device shown in FIG. 3 showing the result of lateral movement of the front of the walker device in phantom.
Figure 7:
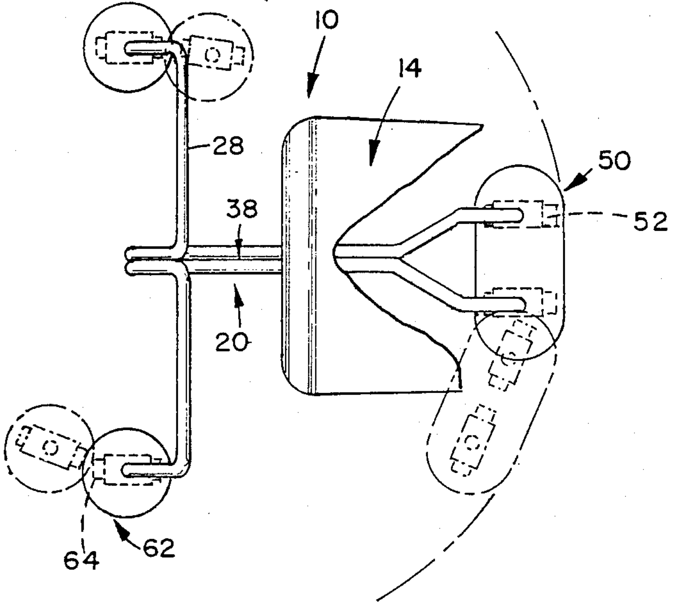
FIG. 7 is a sectional plan view of the walker device shown in FIG. 3 showing the result of lateral movement at the rear of the device in phantom.

The present invention provides many advantages over the prior art. Referring now also to FIGS. 7 and 8, the present invention provides improved stability and mobility due to the relationship between the wheels 52 and 64 which provide a four point weight distribution system for distributing the weight of the seat 12 and any individual sitting thereon. The seat 12 is supported by the frame 20 in front of the rear wheels 52 and behind the forward wheels 64. Because there are four wheels 64 and 52 supporting the frame 20, and because the wheels 52 and 64 are separated and distributed around the seat supporting mechanism 24, the device 10 is quite stable as compared to a device having a three-wheel support system. However, since the rear wheels 52 have a relatively narrow wheel span 58, they are relatively easy to manipulate in order to change directions. There is a tension between having a relatively large wheel span which provides for greater stability and having a relatively narrow wheel span, or no wheel span at all in the case of a device having only a single rear wheel, where the mobility of the rear portion of an assistive device will be maximized with respect to lateral movement or lateral changes of direction. Because the rear wheels 52 of the present invention are relatively close together, it is easier for a person sitting on the seat 12 to push the rear portion of the device 10 in one lateral direction or the other by pushing off with a leg out to one side or the other. The result of such movement is shown in FIG. 7 where the device 10 pivots on a point between the front wheels 64 and the rear wheels 52 turn in the direction of the movement. When the handlebars 28 are pushed laterally, the front wheels 64 turn in the direction of the movement and the device 10 pivots on a point between the rear wheels 52 as shown in FIG. 8. The relative closeness of the rear wheels 52 also make this movement easier to make too. The wheel spans 58 between rear wheels 52 of embodiments of the present invention are preferably about 1–20 inches (about 2.5–50 cm), more preferably about 2–10 inches (about 5–25 cm), even more preferably about 4–8 inches (about 10–20 cm), and most preferably about 5 inches (about 12.7 cm). The width 60 the seat 12 is preferably about 10–25 inches (about 25–65 cm), more preferably about 12–20 inches (about 30–50 cm), and most preferably about 16 inches (about 40 cm).

As shown in phantom in FIG. 5, the frame 20 may include strengthening bar members 78 which attach the outer vertical support members 32*b* to the inner vertical support members 32*a* which form the center vertical support bar 80 of the handlebar supporting mechanism 30. The strengthening bar members 78 not only strengthen the frame 20, particularly the upright handlebar supporting mechanism 30, but they act as a barrier for protection against obstacles jutting in through space between the vertical support members 32 which might otherwise strike the legs of an individual using the walker device 10. This is particularly good protection against the vertical edge of a dresser or commode, or a corner where two walls come together. In addition, the strengthening bar members 78 provide an additional handhold to provide assistance to persons using the assistive device 10, when they are sitting on the seat 12, when they are attempting to engage the seat 12 to reach a sitting position, or when they need assistance in getting up out of the seat 12. Another advantage of the strengthening bar members 78 is that they are placed sufficiently high so as to allow marginally ambulatory persons walking at a slow to moderate speed to have substantially unobstructed gaits as they walk.

In an alternate embodiment which is not shown, the rear wheel 50 mechanisms may be attached to a common base. In all of the preferred embodiments, the wheels 52 are equidistant from a line 76 running through the center of the centerbar 38 as shown in FIG. 3. Each of the four contact points where the device 10 contacts the ground, i.e. each of the rear wheels 52 and each of the forward wheels 64, are important to provide stability for the assistive device 10. If the walker device 10 had only three wheels rather than four, with a single wheel replacing the two rear wheels 52, the device 10 would lack the stability of the present invention because the single rear wheel would allow the device 10 to tip easily when the weight on the seat 12 is shifted from side to side. Instead, however, the present invention provides a pair of rear wheels 52 behind the seat 12 which provide stability, but not at the complete expense of mobility of the rear portion 10*a* of the assistive device 10.

The assistive device 10 of the present invention also provides for easy access and engagement. When an individual approaches the device 10 he or she may step up to one side of the device 10, grip the handlebar 28 or the strengthening bar member 78 of the alternate embodiment on that side of the device 10, and then back into the seat 12 with his or her rear end. When the person's rear end engages the seat portion 14, the person may then fully engage the seat 12 to reach a sitting position. Once the person is in a sitting position he or she can then easily lift one leg over the centerbar 38. Alternatively, since the centerbar 38 is lower than the top of the wheels 64 and 52 in the area where one would approach the assistive device 10, the individual may simply step over the centerbar 38 as the individual grips the handlebar 28 or handlebars 28, and then engage the seat if desired. As shown in FIG. 2, the height 86 of the uppermost portion of the wheels 52 and 64 is greater than the height 88 of the centerbar 38 in the area in front of the seat 12 where one would approach the device 10 in order to use it, which includes the portion of the centerbar 38 over which one must step inorder to straddle the centerbar 38.

Because the handlebars 28 of the preferred embodiment are canted backwards so that the handlebars 28 are located behind the vertical plane 34 of the vertical support members 32, the assistive device 10 is somewhat easier to push and manipulate. When the wheels 64' are also canted such that they are located behind the vertical plane 34' when the device 10' is moving forward, as shown in FIG. 6, the device 10' also provides certain ergonomic advantages in moving the assistive device 10' forward. A further advantage of the positioning of the handlebars 28, is that when they are canted backward, the fingers of an individual gripping the handlebars 28 are removed from the front 10*b* of the device 10 and given some protection from being rammed against a countertop or a table top when the assistive device 10 collides with such an object.

It is also noted that the radius of the circular rubber bumpers 70 also provide a similar advantage in that they protect the hands from being rammed into a wall or the like because they extend out in front of the vertical support members 32. The rubber bumpers 70 and 72 also provide a mechanism for preventing clothing material, such as a cuff or a hem of a gown or a dress, from catching in the wheels 52 and 64 as the wheels 52 and 64 rotate upon the axels 54, 66. In addition, the bumpers 70 and 72 protect furniture which may on occasional collide with the assistive device 10. In this respect, it is also an advantage to have a narrow wheel span 58 for the rear wheels 52. The larger wheel span 84 of the forward wheels 64 is necessarily larger than the rear wheel span 58 in order to allow sufficient space for a person to walk with both feet within the span 84 of the forward wheels 64 while stradling the centerbar 38. The forward wheel span is preferably larger than the seat width 60 in order to allow both legs of an individual using the assistive device 10 to walk freely without obstruction while pushing the assistive device 10.

While certain representative embodiments of the present invention have been described herein for the purposes of illustration, it will be apparent to those skilled in the art that modifications therein may be made without departing from the spirit and scope of the present invention.

What is claimed is:

1. A rehabilitation walker device comprising:

(a) a seat having a center and a width;

(b) frame means including means for supporting said seat, handlebar means including upright means for supporting said handlebar means, said upright handlebar support means including a plurality of vertical support members, two of said vertical support members being adjacent one another, and centerbar means, including adjacent bar members, for connecting said seat support means with said adjacent vertical support members, said handlebar means being located in front of said seat;

(c) a pair of forward wheels pivotally attached to said handlebar support means, said forward wheels being located in front of said seat and being separated by a first wheel span, said first wheel span having a width greater than the width of said seat and being wide enough to allow sufficient space for a person to walk with both feet within said first wheel span while straddling said centerbar means; and (d) a pair of rear wheels independently and pivotally attached to said frame means, said rear wheels being located behind the center of said seat and being separated by a second wheel span, said second wheel span being substantially the same as or narrower than the width of the seat, each of said rear wheels being connected to extensions of one of said adjacent bar members.

2. The rehabilitation walker device of claim 1, said centerbar member being located at a height below an upper most portion of said forward wheels.

3. The rehabilitation walker device of claim 1, said seat support means including adjustment means for adjusting the height of the seat.

4. The rehabilitation walker device of claim 1, said seat including a substantially flat surface and a forward edge extending outwardly and downwardly from said substantially flat surface.

5. The rehabilitation walker device of claim 4, said seat including a back and means for adjusting the position of said back.

6. The rehabilitation walker device of claim 1, each of said wheels being independently attached to said frame means such that each wheel pivots independently of each of the other wheels.

7. The rehabilitation walker device of claim 1, said plurality of vertical support members being located in a vertical plane in front of said seat, said frame means including canted connecting members which connect said handlebar means to said vertical support members, said handlebar means being located behind said vertical plane.

8. The rehabilitation walker device of claim 7, said plurality of vertical support members including a pair of outer vertical support members, each of said forward wheels being attached to said frame beneath one of said outer vertical support members.

9. The rehabilitation walker device of claim 8, each of said forward wheels having a horizontal axis of rotation removed from the space directly beneath the outer vertical support member to which each of said wheels is attached.

10. The rehabilitation walker device of claim 7, said frame means including strengthening bar members connecting upper portions of said vertical support members, thereby strengthening said frame means and providing additional positions on said frame for a person to grip when seated or being seated on said seat, said strengthening bar members being located at a height which allows a marginally ambulatory person walking at a slow to moderate speed to have a substantially unobstructed gait.

11. The rehabilitation walker device of claim 1, said frame means including resilient bumper means for preventing collisions between the wheels and objects encountered by the frame.

12. The rehabilitation walker device of claim 1, said second wheel span being narrower than the width of the seat.

13. A rehabilitation walker device comprising:

(a) a seat having a center and a width;

(b) frame means including means for supporting said seat, handlebar means including upright means for supporting said handlebar means, said upright handle support means including a plurality of vertical support members, two of said vertical support members being adjacent one another, and centerbar means, including adjacent bar members, for connecting said seat support means with said adjacent vertical support members, said handlebar means being located in front of said seat, said plurality of vertical support members being located in a vertical plane in front of said seat, said frame means including canted connecting members which connect said handlebar means to said vertical support members, said handlebar means being located behind said vertical plane;

(c) a pair of forward wheels pivotally attached to said handlebar support means, said forward wheels being located in front of said seat and being separated by a first wheel span, said first wheel span having a width greater than the width of said seat and being wide enough to allow sufficient space for a person to walk with both feet within said first wheel span while straddling said centerbar means, said centerbar means including a centerbar member, said centerbar member being located at a height below an upper most portion of said forward wheels;

(d) a pair of rear wheels pivotally attached to said frame means, each of said rear wheels being connected to extensions of one of said adjacent bar members, each of said wheels being independently attached to said frame means such that each wheel pivots independently of each of the other wheels, said rear wheels being located behind the center of said seat and being separated by a second wheel span, said second wheel span being narrower than the width of the seat; and (e) resilient bumper means for preventing collisions between said wheels and objects encountered by said bumper means, said bumper means being attached to said frame in locations proximate each of said wheels.

14. The rehabilitation walker device of claim 13, said seat support means including adjustment means for adjusting the height of the seat.

15. The rehabilitation walker device of claim 13, said seat including a substantially flat surface and a forward edge extending outwardly and downwardly from said substantially flat surface.

16. The rehabilitation walker device of claim 15, said seat including a back and means for adjusting the position of said back.

17. The rehabilitation walker device of claim 13, said frame means including strengthening bar members connecting upper portions of said vertical support members, thereby strengthening said frame means and providing additional positions on said frame for a person to grip when seated or being seated on said seat, said strengthening bar members being located at a height which allows a marginally ambulatory person walking at a slow to moderate speed to have a substantially unobstructed gait.

18. The rehabilitation walker device of claim 13, said plurality of vertical support members including a pair of outer vertical support members, each of said forward wheels being attached to said frame beneath one of said outer vertical support members, each of said forward wheels having a horizontal axis of rotation removed from the space directly beneath the outer vertical support member to which each of said wheels is attached.

* * * * *